United States Patent
Menze (10) Patent No.: US 9,387,572 B2
(45) Date of Patent: Jul. 12, 2016

(54) WORKPIECE CLAMP FOR MITER SAW

(75) Inventor: Gregory Alan Menze, Mount Prospect, IL (US)

(73) Assignee: Robert Bosch GmbH, Stuttgart (DE)

( * ) Notice: Subject to any disclaimer, the term of this patent is extended or adjusted under 35 U.S.C. 154(b) by 377 days.

(21) Appl. No.: 13/227,327

(22) Filed: Sep. 7, 2011

(65) Prior Publication Data

US 2013/0055872 A1 Mar. 7, 2013

(51) Int. Cl.
*B25B 5/00* (2006.01)
*B25B 5/16* (2006.01)
*B23D 47/04* (2006.01)
*B25B 5/06* (2006.01)
*B25B 5/12* (2006.01)

(52) U.S. Cl.
CPC .............. *B25B 5/006* (2013.01); *B23D 47/04* (2013.01); *B25B 5/068* (2013.01); *B25B 5/12* (2013.01); *B25B 5/127* (2013.01); *B25B 5/166* (2013.01); *Y10T 83/7493* (2015.04); *Y10T 83/758* (2015.04)

(58) Field of Classification Search
CPC ............ B25B 5/00; B25B 5/02; B25B 5/085; B25B 5/102; B25B 5/103; B25B 5/12; B25B 5/127; B25B 5/166; B23D 47/04; B23Q 3/02; B23Q 3/002
USPC ........... 83/452, 453, 456, 457, 462, 464, 466, 83/467.1, 468.2, 468.3; 269/71, 73, 95, 269/164, 237, 238, 239, 201, 3, 6, 58
See application file for complete search history.

(56) References Cited

U.S. PATENT DOCUMENTS

| | | | | |
|---|---|---|---|---|
| 1,187,109 A | * | 6/1916 | Steuernagel | 269/204 |
| 1,452,753 A | * | 4/1923 | Otto et al. | 269/189 |
| 3,245,289 A | * | 4/1966 | Nelson | 408/98 |
| 4,011,649 A | | 3/1977 | Hawkins | |
| 4,141,543 A | | 2/1979 | Kato | |

(Continued)

FOREIGN PATENT DOCUMENTS

| | | | | |
|---|---|---|---|---|
| CH | 188936 A | * | 1/1937 | |
| CH | 273155 A | * | 1/1951 | |

(Continued)

OTHER PUBLICATIONS

English Translation of DE9114009.*

(Continued)

*Primary Examiner* — Kenneth E. Peterson
*Assistant Examiner* — Jennifer Swinney
(74) *Attorney, Agent, or Firm* — Maginot Moore & Beck LLP (57) ABSTRACT

A clamp apparatus for connection to a miter saw includes a shaft and a carriage assembly. The carriage assembly is slidably coupled to the shaft. The carriage assembly includes a carriage body, a first camp assembly, and a second clamp assembly. The first clamp assembly is configured for movement relative to the carriage body between a first clamp position and a second clamp position. The first clamp assembly is further configured (i) to enable movement of the carriage body relative to the shaft when the first clamp assembly is in the first clamp position and (ii) to prevent movement of the carriage body relative to the shaft when the first clamp assembly is in the second clamp position. The second clamp assembly is configured for movement relative to the carriage body between a third camp position and a fourth clamp position.

16 Claims, 3 Drawing Sheets

(56) References Cited

U.S. PATENT DOCUMENTS

| | | | | |
|---|---|---|---|---|
| 4,702,512 A | * | 10/1987 | Nocera | 269/77 |
| 5,913,509 A | * | 6/1999 | Price et al. | 269/71 |
| 5,921,535 A | | 7/1999 | Lutz, III | |
| 6,595,507 B2 | | 7/2003 | Dykstra | |
| 7,721,632 B2 | * | 5/2010 | Chen | 83/452 |
| 2008/0106020 A1 | * | 5/2008 | Sherlock | 269/71 |

FOREIGN PATENT DOCUMENTS

| | | | | | |
|---|---|---|---|---|---|
| CH | 284159 A | * | 7/1952 | | A47J 45/02 |
| CH | 440171 A | | 7/1967 | | |
| CH | 668377 A | * | 12/1988 | | |
| CN | 2745684 | | 12/2005 | | |
| CN | 101875204 | | 11/2010 | | |
| DE | 2816688 A1 | * | 10/1979 | | |
| DE | 3140901 A1 | * | 5/1983 | | F16B 2/18 |
| DE | 9114009 U1 | * | 4/1992 | | B25B 5/068 |
| DE | 19513907 A1 | | 10/1995 | | |
| DE | 29922235 U1 | * | 3/2000 | | |
| DE | 202006007104 U1 | | 7/2006 | | |
| DE | 102006011280 A1 | * | 9/2007 | | |
| EP | 0271393 A1 | | 6/1988 | | |
| EP | 2113327 A1 | | 11/2009 | | |
| FR | 347983 A | * | 3/1905 | | |
| FR | 476405 A | * | 8/1915 | | |
| FR | 1077522 A | * | 11/1954 | | |
| FR | 111142 A | * | 2/1956 | | |
| FR | 2871718 A3 | | 12/2005 | | |
| GB | 1333063 A | * | 10/1973 | | |
| JP | H10138040 | | 5/1995 | | |
| JP | 2000084861 A | * | 3/2000 | | B25B 1/02 |
| WO | WO 9712730 A1 | * | 4/1997 | | B25B 5/085 |

OTHER PUBLICATIONS

International Search Report and Written Opinion in corresponding PCT application (i.e., PCT/US2012/054200), mailed Jan. 17, 2013 (12 pages).
DE-STA-CO, 603—Straight Line Action Clamp, Product specification and device photograph from manufacturer website, available at least as early as Sep. 6, 2011.
Makita, digital photograph of Makita MLT-100 Miter Gauge, available at least as early as Sep. 6, 2011.
Roto-Zip, digital photograph of Roto-Zip Tile Dock, availalble at least as early as Sep. 6, 2011.
Skil, digital photograph of Skil Flooring Saw, available at least as early as Sep. 6, 2011.
English Translation of Office Action Issued by Chinese State Intellectual Property Office in Corresponding CN App. No. 201280054573.1, mailed Apr. 21, 2015 (11 pages).

* cited by examiner

WORKPIECE CLAMP FOR MITER SAW

FIELD

This patent relates generally to clamps, and particularly to workpiece clamps for use with miter saws.

BACKGROUND

Miter saws are used for cutting and shaping workpieces, such as, hardwood, manufactured wood products, construction lumber, and other materials. The typical miter saw includes a base on which a turntable is mounted for rotation. The turntable and a portion of the base define a workpiece support surface, on which a workpiece to be cut by the miter saw is positioned. A support assembly of the miter saw is connected to the turntable and functions to support a cutting assembly that is operable to perform a cutting operation on the workpiece. The support assembly includes components that enable the cutting assembly to move upward and downward in relation to the turntable in order to cut the workpiece positioned thereon.

Some miter saws are configured for use with a workpiece clamp, which operates to fixedly position a workpiece on the workpiece support surface. Known workpiece clamps are typically connected to the base of the miter saw. When a workpiece clamp is in a clamped configuration, the clamp applies a clamping force to the workpiece. The clamping force fixedly maintains the position of the workpiece relative to the workpiece support surface as the cutting assembly cuts the workpiece.

Known workpiece clamps adequately position the workpiece on the workpiece support surface; however, some users may desire a workpiece clamp that is easily adjustable to the dimensions of the particular workpiece being cut by the miter saw. For example, some users may find it time consuming to adjust known workpiece clamps to the thickness of the particular workpiece being cut. Specifically, some workpiece clamps are adjustable to the thickness of a workpiece only through a trial and error process, which involves making an adjustment to the clamp and then repeatedly moving the clamp between the clamped configuration and an unclamped configuration until a desired clamping force is achieved.

Therefore, it would be desirable to provide an improved workpiece clamp that increases the ease with which the clamp is adjusted to the dimensions of a workpiece.

SUMMARY

According to one embodiment of the disclosure, there is provided a clamp apparatus for connection to a miter saw. The clamp apparatus includes a shaft and a carriage assembly. The shaft is configured for connection to the miter saw. The carriage assembly is slidably coupled to the shaft. The carriage assembly includes a carriage body, a first clamp assembly, and a second clamp assembly. The first clamp assembly is configured for movement relative to the carriage body between a first clamp position and a second clamp position. The first clamp assembly is further configured (i) to enable movement of the carriage body relative to the shaft when the first clamp assembly is in the first clamp position and (ii) to prevent movement of the carriage body relative to the shaft when the first clamp assembly is in the second clamp position. The second clamp assembly is configured for movement relative to the carriage body between a third clamp position and a fourth clamp position. The second clamp assembly includes a foot member configured to move away from the carriage body when the second clamp assembly is moved from the third clamp position to the fourth clamp position.

According to another embodiment of the disclosure, there is provided a workpiece clamp apparatus for connection to a miter saw. The workpiece clamp apparatus includes a shaft and a carriage assembly. The shaft is configured for connection to the miter saw. The carriage assembly is slidably coupled to the shaft. The carriage assembly includes a carriage body, a first clamp assembly, and a second clamp assembly. The carriage body is slidable on the shaft for a first distance. The first clamp assembly is configured for movement relative to the carriage body between a first clamp position and a second clamp position. The first clamp assembly includes a foot member configured to move away from the carriage body for a second distance when the first clamp assembly is moved from the first clamp position to the second clamp position. The first distance is substantially greater than the second distance.

According to yet another embodiment of the disclosure, there is provided a clamp apparatus for connection to a support structure of a miter saw. The clamp apparatus includes a first shaft, a carriage body, a first clamp assembly, and a second clamp assembly. The first shaft is configured for connection to the support structure of the miter saw. The carriage body is slidably coupled to the first shaft. The first clamp assembly is coupled to the carriage body. The first clamp assembly is configured for movement relative to the carriage body between a first clamp position and a second clamp position. The first clamp assembly is further configured (i) to enable movement of the carriage body relative to the first shaft when the first clamp assembly is in the first clamp position and (ii) to prevent movement of the carriage body relative to the first shaft when the first clamp assembly is in the second clamp position. The second clamp assembly is coupled to the carriage body. The second clamp assembly is configured for movement relative to the carriage body between a third clamp position and a fourth clamp position. The second clamp assembly includes a foot member configured to move away from the carriage body when the second clamp assembly is moved from the third clamp position to the fourth clamp position.

BRIEF DESCRIPTION OF THE DRAWINGS

The above-described features and advantages, as well as others, should become more readily apparent to those of ordinary skill in the art by reference to the following detailed description and the accompanying figures in which.

DETAILED DESCRIPTION

Figure 1:
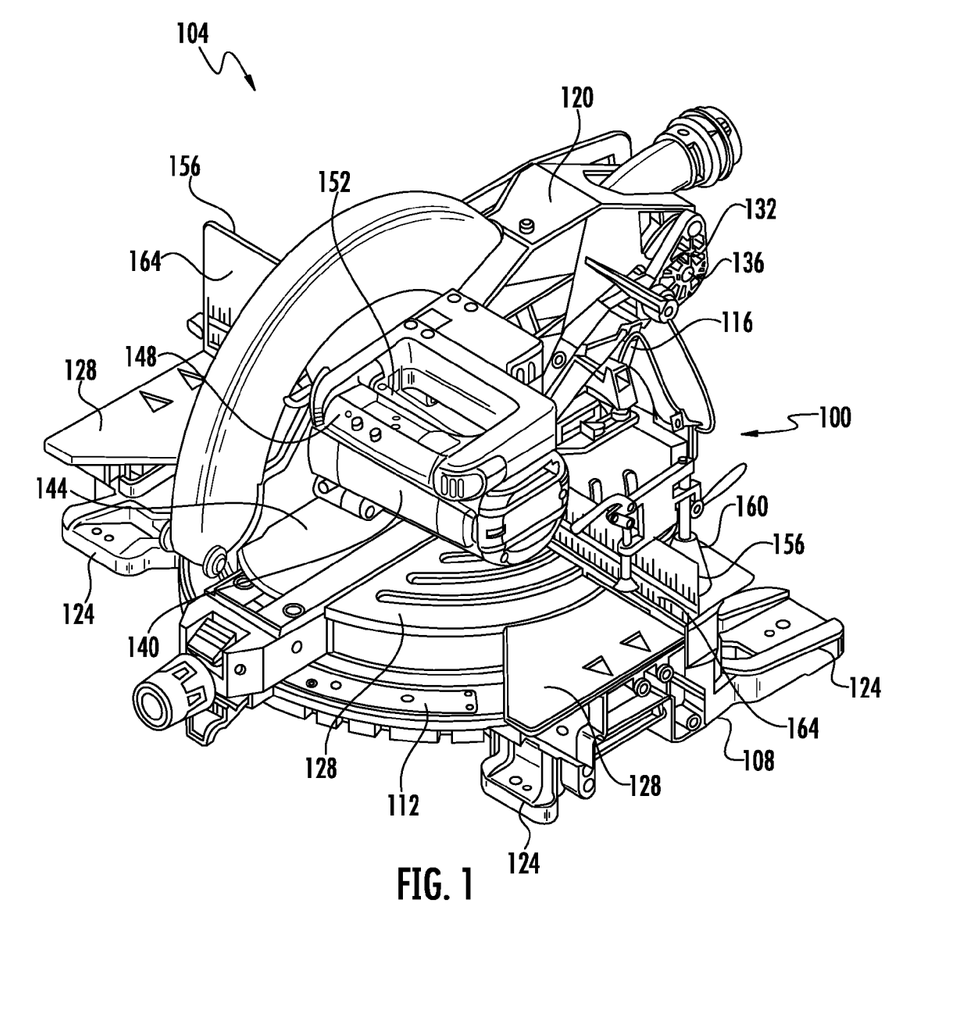
FIG. 1 is a perspective view of a clamp apparatus, as disclosed herein, connected to a miter saw.

FIG. 1 shows a clamp apparatus 100 of the disclosure attached to a miter saw 104. The clamp apparatus 100 is used to maintain the position of a workpiece W (see FIGS. 2 and 3) to be cut by the miter saw 104. The clamp apparatus 100 is quickly and easily adjustable to the dimensions of the workpiece W. A description of the miter saw 104 precedes a description of the clamp apparatus 100.

As shown in FIG. 1, a power saw, provided as a miter saw 104, includes a base 108, a turntable 112, a support arm 116, and a cutting arm 120. The base 108 defines four foot members 124 (three of which are visible in FIG. 1), which are configured for placement on a work surface (not shown), such as a workbench, a miter saw stand, or simply a ground surface. The base 108 is at least partially formed from a rigid material such as aluminum, steel, high strength plastic, or the like. An upper surface of the base 108 is configured to define a portion of a workpiece support surface 128. The workpiece support surface 128 is a substantially flat surface on which a user may position a workpiece W to be cut by the miter saw 104.

The turntable 112 is rotatably supported on the base 108, such that the turntable is configured for movement relative to the base. An upper surface of the turntable 112 is configured to define another portion of the workpiece support surface 128. The turntable 112 is at least partially formed from a rigid material such as aluminum, steel, high strength plastic, or the like.

The support arm 116 is configured to extend from a rear side of the turntable 112. Depending on the type of miter saw 104, a bevel portion 132 of the support arm 116 is movable relative to the workpiece support surface 128 to enable the miter saw 104 to make beveled cuts in a workpiece W.

The cutting arm 120 is configured for pivotal connection to the support arm 116 by a pivot shaft 136. In particular, the cutting arm 120 is configured to pivot about the pivot shaft 136 to and between a raised position (not shown) and a lowered position (shown in FIG. 1).

As shown in FIG. 1, the cutting arm 120 includes an electric motor 140, a saw blade 144, and a handle portion 148. The electric motor 140 is supported by the cutting arm 120 and includes a motor shaft (not shown). The motor shaft is configured to rotate in response to the electric motor 140 being coupled to a source of electrical energy. Rotation of the motor shaft is coupled to an arbor assembly (not shown), which supports the saw blade 144. In one embodiment, the electric motor 140 is a brushless DC motor; however, the electric motor may be any type of electric motor as desired by those of ordinary skill in the art.

The saw blade 144 is a circular saw blade configured to be mounted on the arbor assembly of the cutting arm 120. The perimeter of the saw blade 144 includes a plurality of cutting teeth. Alternatively, the saw blade 144 includes a highly abrasive perimeter, as commonly provided on diamond cutting blades.

The handle portion 148 extends from the cutting arm 120. The handle portion 148 is configured to be grasped by a user as the user pivots the cutting arm 120 between the raised position and the lowered position. The handle portion 148 includes a power switch 152, which is movable to connect and to disconnect the electric motor 140 from the source of electrical power.

With reference still to FIG. 1, the miter saw 104 further includes a fence member 156 and a connection element 160, each of which are connected to the base 108. The fence member 156 is configured to fixedly extend from the base 108. The fence member 156 defines a face 164, against which a workpiece W is configured to be positioned.

Figure 2:
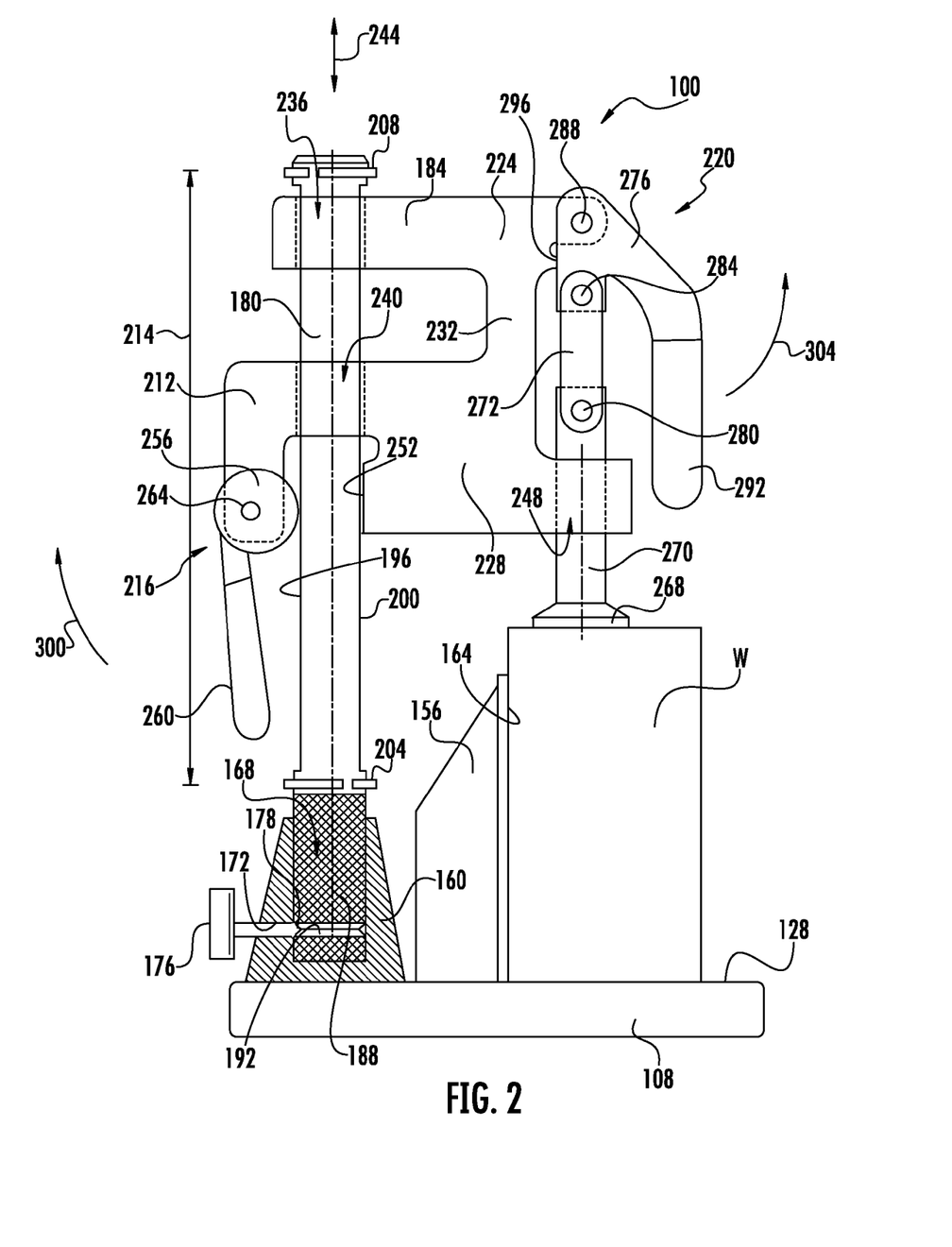
FIG. 2 is a side elevational view of the clamp apparatus of FIG. 1 and a portion of the miter saw, a carriage clamp of the clamp apparatus is shown in a clamped position and a workpiece clamp of the clamp apparatus is shown in a clamped position.

As shown in FIG. 2, the connection element 160 extends from the base 108 and is configured to receive and to support the clamp apparatus 100. The connection element 160 is welded to the base 108; however, in other embodiments the connection element 160 is connected to the base 108 with fasteners, or the connection element and the base are a monolithic assembly. The connection element 160 may extend from any portion of the base 108, the turntable 112, or any other part of the miter saw 104. The connection element 160 defines a connection cavity 168 into which a portion of the clamp apparatus 100 is configured to be inserted. The connection cavity 168 is a generally cylindrical cavity. The connection element 160 is formed from materials such as aluminum, steel, high strength plastic, or the like.

The connection element 160 also defines a screw opening 172, through which a thumbscrew 176, or other type of fastener, is threadingly received. The screw opening 172 is fluidly connected to the connection cavity 168.

The thumbscrew 176 is configured to be positioned in an extended position and a retracted position within the screw opening 172. In the extended position (shown in FIGS. 2 and 3), an end portion 178 of the thumbscrew 176 is positioned within the connection cavity 168. In the retracted position, the end portion 178 of the thumbscrew is positioned outside of the connection cavity 168.

Figure 3:
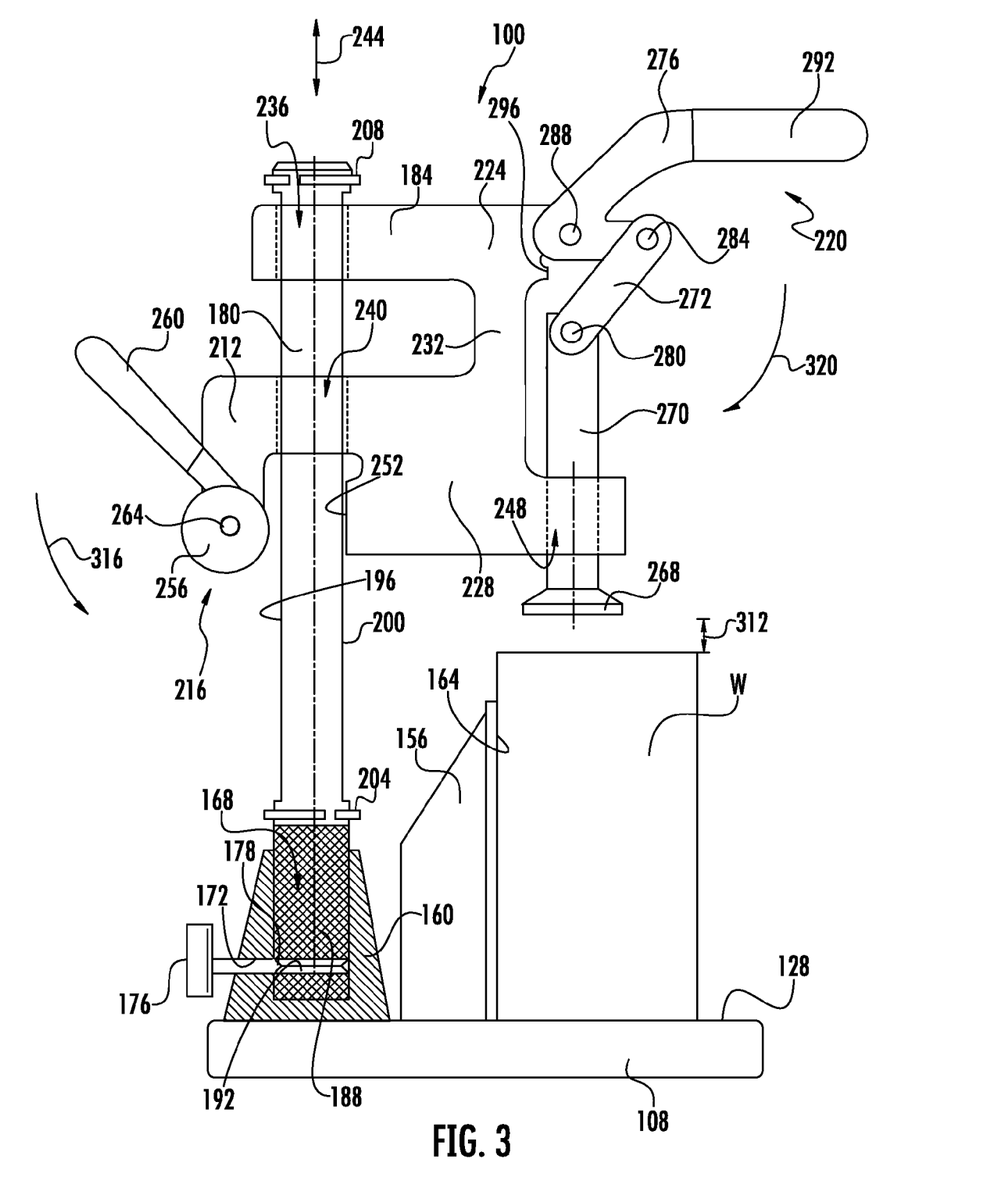
FIG. 3 is a side elevational view of the clamp apparatus of FIG. 1 and a portion of the miter saw, the carriage clamp of the clamp apparatus is shown in an unclamped position and the workpiece clamp of the clamp apparatus is shown in an unclamped position.

As shown in FIG. 2, the clamp apparatus 100 includes a shaft 180 and a carriage assembly 184. The shaft 180 is configured for connection to the miter saw 104. In particular, a connection portion 188 of the shaft 180 is configured to be received by the connection element 160. The shaft 180 is formed from a rigid material, such as aluminum, steel, high strength plastic, or the like. The shaft 180, as shown in the embodiment illustrated in FIGS. 2 and 3, is approximately fifteen centimeters long. In other embodiments, the shaft 180 may be shorter or longer to accommodate a particular size or type of workpiece W. As shown in FIG. 2, the shaft 180 has a generally cylindrical form. The shaft 180, however, may be provided as an elongate member having any of several forms including rectangular, square, elliptical, and the like. The shaft 180 in the embodiment shown in FIG. 2 is a solid member, but other embodiments of the shaft may be at least partially hollow.

The connection portion 188 of the shaft 180 is a generally cylindrical end portion. The connection portion 188 has an outside diameter that is slightly smaller than an inside diameter of the connection cavity 168. Accordingly, at least a portion of the connection portion 188 is configured to fit within the connection cavity 168. When the connection portion 188 is received by the connection element 160, the shaft 180 extends perpendicularly from the base 108.

A groove 192 is formed in the connection portion 188 to receive the end portion 178 of the thumbscrew 176. The groove 192 extends around the entire circumference of the connection portion 188. In some embodiments of the shaft 180, the connection portion 188 has a knurled or otherwise textured surface.

The shaft 180 includes a lower shoulder 204 and an upper shoulder 208. The lower shoulder 204 is positioned above the connection portion 188. The lower shoulder 204 is a split ring seated in a groove (not shown) formed in the shaft 180. A width (diameter) of the lower shoulder 204 is wider than the width (diameter) of the shaft 180.

With continued reference to FIG. 2, the upper shoulder 208 is positioned on an end of the shaft opposite to the lower shoulder 204. The upper shoulder 208 is substantially identical to the lower shoulder 204 and is provided as a split ring seated in another groove (not shown) formed in the shaft 180. A width (diameter) of the upper shoulder 208 is wider than the width (diameter) of the shaft 180. The distance 214 between the lower shoulder 204 and the upper shoulder 208 defines a range of sliding movement of the carriage assembly 184.

The shaft 180 defines a left clamp face 196 and an opposite right clamp face 200. The left clamp face 196 is a substantially flat surface formed on the shaft 180 between the lower shoulder 204 and the upper shoulder 208. Similarly, the right clamp face 200 is a substantially flat surface formed on the shaft 180 between the lower shoulder 204 and the upper shoulder 208. The left clamp face 196 defines a plane that is substantially normal to a plane defined by the right clamp face 200.

As shown in FIG. 2, the carriage assembly 184 includes a carriage body 212, a carriage clamp 216, and a workpiece clamp 220. The carriage body 212 is slidably coupled to the shaft 180. The carriage body 212 defines an upper arm 224 and a lower arm 228, which extend from a neck portion 232. The carriage body 212 is formed from a rigid material such as aluminum, steel, high strength plastic or the like.

An upper bore 236 is formed in the upper arm 224 of the carriage body 212. The upper bore 236 is a generally cylindrical cavity, which extends through the upper arm 224. A diameter of the upper bore 236 is larger than the diameter of the shaft 180 to enable the shaft to extend through the upper bore. The diameter of the upper bore 236 is slightly smaller than the diameter of the upper shoulder 208, to prevent the upper shoulder from passing though the upper bore 236.

A lower bore 240 is formed in the lower arm 228 of the carriage body 212. The lower bore 240 is a generally cylindrical cavity, which extends through the lower arm 228 of the carriage body 212. A diameter of the lower bore 240 is larger than the diameter of the shaft 180 to enable the shaft to extend through the lower bore. The diameter of the lower bore 240 is slightly smaller than the diameter of the lower shoulder 204, to prevent the lower shoulder from passing though the lower bore 240.

The upper bore 236 and the lower bore 240 are aligned with each other such that a longitudinal axis 244 of the shaft 180 extends through a center of the upper bore and the lower bore. Accordingly, the shaft 180 is slidably received by the upper bore 236 and the lower bore 240 simultaneously.

The carriage body 212 includes a clamp bore 248 formed in the lower arm 228 of the carriage body. The clamp bore 248 is a generally cylindrical cavity, which extends through the lower arm 228. The clamp bore 248 is configured to slidably receive a portion of the workpiece clamp 220.

The carriage body 212 defines a clamp surface 252 on the lower arm 228 below the lower bore 240 and across from the carriage clamp 216. The clamp surface 252 is a flat surface configured to be positioned against the right clamp face 200.

The carriage clamp 216 is configured for movement relative to the carriage body 212 between a clamped position and an unclamped position. As shown in FIG. 2, the carriage clamp 216 is in the clamped position, in which the carriage clamp is configured to prevent movement of the carriage body 212 relative to the shaft 180. As shown in FIG. 3, the carriage clamp 216 is in the unclamped position, in which the carriage clamp is configured to enable movement of the carriage body 212 relative to the shaft 180.

The carriage clamp 216 includes an eccentric member 256 and a handle member 260. The eccentric member 256 is a generally cylindrical member, which is pivotally connected to the lower arm 228 of the carriage body 212. A pivot shaft 264 extends through the eccentric member 256 in a position that is offset from the center of the eccentric member. The eccentric member 256 is formed form a rigid material such as aluminum, steel, high strength plastic, or the like. In another embodiment, the eccentric member 256 may be a cam member.

The handle member 260 of the carriage clamp 216 extends from the eccentric member 256. As shown in FIG. 2, the handle member 260 is integral with the eccentric member 256. In other embodiments, however, the handle member 260 may be connected to the eccentric member 256, by welding, fasteners, and/or another connection method. The handle member 260 is configured to be grasped by a user to move the carriage clamp 216 between the clamped and the unclamped positions. The handle member 260 may be at least partially covered with an elastomeric material configured to be gripped by a user of the carriage clamp 216. The handle member 260 is formed form a rigid material such as aluminum, steel, high strength plastic, or the like.

The workpiece clamp 220 of the carriage assembly 184 is configured for movement relative to the carriage body 212 between a clamped position and an unclamped position. As shown in FIG. 2, the workpiece clamp 220 is in the clamped position, in which the workpiece clamp is configured to apply a clamping force to the workpiece W. As shown in FIG. 3, the workpiece clamp 220 is in the unclamped position, in which the workpiece clamp does not apply the clamping force to the workpiece W.

The workpiece clamp 220 includes a clamp foot 268, a foot link 270, an intermediate link 272, and a handle link 276. The clamp foot 268, which may also be referred to as a foot member, extends from a lower end of the foot link 270. As shown in FIGS. 2 and 3, the clamp foot 268 is connected to the lower end of the foot link 270, such that the clamp foot is movable relative to the foot link to compensate for the orientation of the upper surface of the workpiece W. Alternatively, the clamp foot 268 is integrally formed with the foot link 270, thereby making the clamp foot and the foot link a monolithic part. When the clamp foot 268 is integrally formed with the foot link 270 the clamp foot is immovable relative to the foot link. The clamp foot 268 is formed from a rigid material such as aluminum, steel, high strength plastic, or the like. A surface of the clamp foot 268, which is configured to contact the workpiece W, may be at least partially covered with an elastomeric material (not shown) configured to prevent the clamp foot from scratching or marring the workpiece W.

The foot link 270 is configured to be slidably received by the clamp bore 248 formed in the lower arm 228 of the carriage body 212. The foot link 270 is a generally cylindrical shaft having an outside diameter that is slightly smaller than the inside diameter of the clamp bore 248. The foot link 270 is formed from a rigid material such as aluminum, steel, high strength plastic, or the like.

The intermediate link 272 is pivotally connected to the foot link 270 with a pivot shaft 280, which extends through an opening in the foot link and an opening in the intermediate link. The intermediate link 272 is also pivotally connected to the handle link 276 with a pivot shaft 284, which extends through another opening in the intermediate link and an opening in the handle link. The intermediate link 272 is formed from a rigid material such as aluminum, steel, high strength plastic, or the like.

The handle link 276 is pivotally connected to the upper arm 224 of the carriage body 212 with a pivot shaft 288, which extends through an opening in the handle link and an opening in the upper arm of the carriage body. The handle link 276 is configured to abut a stop surface 296 of the carriage body 212 when the workpiece clamp 220 is in the clamped position. The handle link 276 is formed from a rigid material such as aluminum, steel, high strength plastic, or the like.

The handle link 276 includes a handle portion 292 configured to be grasped by a user to move the workpiece clamp 220 between the clamped and the unclamped positions. The handle portion may be at least partially covered with an elastomeric material configured to be gripped by a user of the workpiece clamp 220.

In operation, the clamp apparatus 100 is connectable to a miter saw 104 and is configured to maintain the position of the workpiece W to be cut by the miter saw. To connect the clamp apparatus 100 to the miter saw 104, first the thumbscrew 176 is rotated in a direction configured to withdraw the end portion 178 from the connection cavity 168. Next, the connection portion 188 of the shaft 180 is inserted into the connection cavity 168 of the connection element 160.

After the connection portion 188 of the shaft 180 is inserted into the connection cavity 168 the thumbscrew 176 is rotated in an opposite direction configured to cause the end portion 178 to move into the connection cavity. The thumbscrew 176 is rotated in the opposite direction until the end portion 178 is seated in the groove 192, at which point the thumbscrew prevents withdrawal of the shaft 180 from the connection cavity 168.

The shaft 180 is rotatable relative to the connection element 160 after the thumbscrew 176 is seated in the groove 192. Accordingly, the shaft 180 and the carriage assembly 184 may be rotated to cause the clamp foot 268 to move in an arcuate path relative to the workpiece support surface 128. This range of movement enables the clamp foot 268 to contact various sizes of the workpiece W.

Next, the carriage assembly 184 is adjusted to the dimensions of the workpiece W according to a two-stage process. In the first stage, the height of the carriage assembly 184 is adjusted. In the second stage the workpiece clamp 220 is configured to apply the clamp force to the workpiece W.

To adjust the height of the carriage assembly 184, the carriage clamp 216 is moved from the clamped position (FIG. 2) to the unclamped position (FIG. 3). To move the carriage clamp 216 to the unclamped position, the handle member 260 is moved in a release direction, which is shown by the arrow 300 in FIG. 2. As the handle member 260 is moved in the release direction, the eccentric member 256 is rotated about the pivot shaft 264, which causes the eccentric member to move out of contact with the left clamp face 196 of the shaft 180. When the handle member 260 is moved to the position shown in FIG. 3, the carriage clamp 216 is in the unclamped position and the carriage body 212 is freely movable along the length of the shaft 180 within the range shown by length 214.

After the carriage clamp 216 is in the unclamped position, the workpiece clamp 220 is moved from the clamped position (FIG. 2) to the unclamped position (FIG. 3). To move the workpiece clamp 220 to the unclamped position the handle portion 292 is moved in a release direction, which is shown by the arrow 304 in FIG. 2. As the handle member 292 is moved in the release direction, the handle link 276 pivots about the pivot shaft 288 and causes the pivot shaft 284 and the intermediate link 272 to move away from the workpiece W. The upward movement of the intermediate link 272 also causes the foot link 270 and the clamp foot 268 to move away from the workpiece W. In particular, when the workpiece clamp 220 is moved from the clamped position to the unclamped position the clamp foot 268 is moved upward a distance referred to as a stroke 312 (FIG. 3) of the workpiece clamp. The sliding distance of the carriage assembly 184, represented by the distance 214, is substantially greater than the stroke 312.

Next, the carriage assembly 184 is moved about the shaft 180 until the clamp foot 268 is positioned a predetermined distance from the workpiece W. Specifically, the carriage assembly 184 is moved along the shaft 180 until the clamp foot 268 is positioned a distance of less than the stroke 312 from the workpiece (i.e. the predetermined distance). The closer the clamp foot 268 is positioned to the workpiece W the greater the clamping force the workpiece clamp 220 applies to the workpiece when the workpiece clamp 220 is moved to the clamped position.

After the clamp foot 268 is positioned the predetermined distance from the workpiece W, the carriage clamp 216 is moved to the clamped position in order to fix the position of the carriage body 212 relative to the shaft 180. To move the carriage clamp 216 to the clamped position the handle member 260 is moved in a clamped direction along the path 316 (FIG. 3). As the handle member 260 is moved in the clamped direction the eccentric member 256 pivots about the pivot shaft 264 and a portion of the eccentric member moves closer to the clamp surface 252. The movement of the eccentric member 256 closes the gap between the eccentric member and the left clamp face 196 and also closes the gap between the right clamp face 200 and the clamp surface 252. When the handle member 260 is positioned as shown in FIG. 2, a portion of the eccentric member 256 is positioned against the left clamp face 196 and the clamp surface 252 is positioned against the right clamp face 200. Accordingly, the shaft 180 is clamped between the eccentric member 256 and the clamp surface 252, and the position of the carriage body 212 is fixed relative to the shaft. Moving the carriage clamp 216 to the clamped position completes the first stage of adjusting the clamp apparatus 100 to the dimensions of the workpiece W.

The next stage of adjusting the clamp apparatus 100 includes moving the workpiece clamp 220 from the unclamped position (FIG. 3) to the clamped position (FIG. 2). To move the workpiece clamp 220 to the clamped position, the handle portion 292 is moved in a clamped direction along the path 320. As the handle portion 292 is moved in clamped direction, the handle link 276 pivots about the pivot shaft 288 and causes the pivot shaft 284 and the intermediate link 272 to move toward the workpiece W. The movement of the intermediate link 272 causes the foot link 270 and the clamp foot 268 to move toward the workpiece W and the workpiece support surface 128.

The workpiece clamp 220 is positioned in the clamped positioned when the handle link 276 is positioned against the stop surface 296. In the clamped position the handle link 276, the intermediate link 272, and the foot link 270 are positioned in an over center orientation, which prevents the clamp foot 268 and the foot link 270 from moving away from the workpiece W. Accordingly, in the clamped position the workpiece clamp 220 maintains the clamping force against the workpiece W without user effort.

When the clamping force is applied to the workpiece W, the miter saw 104 may be used to cut the workpiece. The clamping force assists in preventing movement of the workpiece W relative to the workpiece support surface 128 as the workpiece is cut by the miter saw 104.

The clamp apparatus 100 is easily configured to apply the clamping force to another workpiece (referred to as an uncut workpiece, not shown), which is substantially identical to the workpiece W. In particular, after the workpiece W is cut by the miter saw 104, the workpiece clamp 220 is moved to the unclamped position to release the clamping force and to move the clamp foot 268 upward by the distance of the stroke 312. Next, the cut workpiece W is removed from the workpiece support surface 128 and the uncut workpiece is positioned on the workpiece support surface. Thereafter, the workpiece clamp 220 is moved to the clamped position to apply the clamping force to the uncut workpiece. The workpiece clamp 220 applies the same clamping force to the uncut workpiece as was applied to the workpiece W without any reconfiguration of the clamp apparatus 100. This process can be repeated for additional uncut workpieces.

The clamp apparatus 100 is easily adjustably to apply the clamping force to a workpiece (referred to as a new workpiece not shown) having a different thickness than the workpiece W. First, the carriage clamp 216 and the workpiece clamp 220 are moved to the unclamped positions. Second, the carriage assembly 184 is moved along the shaft 180 to position the clamp foot 268 a distance less than the stroke 312 above the new workpiece. Third, the carriage clamp 216 is moved to the clamped position. Fourth, the workpiece clamp 220 is moved to the clamped position to apply the clamping force to the new workpiece. Therefore, the clamping apparatus 100 eliminates the trial and error approach used to configure some other known clamping members.

In another embodiment of the clamp apparatus 100, the connection element 160 does not include the thumbscrew 176 or the screw opening 172, and the connection portion 188 of the shaft 180 does not include the groove 192. In this embodiment, friction between the connection portion 188 and the connection element 160 prevents separation of the clamp apparatus 100 from the connection element 160 when the workpiece clamp 220 applies the clamp force to the workpiece W. In particular, when the workpiece clamp 220 applies the clamp force, the shaft 180 is moved slightly such that connection portion 188 is wedged against the sides of the connection cavity 168. Friction between the knurled or otherwise textured surface of the connection portion 188 and the sides of the connection cavity 168 prevents the clamp apparatus 100 from being separated from the connection element 160. When the workpiece clamp 220 is in the unclamped position, the clamp apparatus 100 is separable from the connection element 160 by moving the clamp apparatus away from the connection element along the longitudinal axis 244.

While the clamp apparatus 100 and miter saw 104 have been illustrated and described in detail in the figures and the foregoing description, the same should be considered as illustrative and not restrictive in character. For example, the clamp apparatus 100 may be connected to and used with any type of power tool including, but not limited to, table saws, band saws, jig saws, and disc sanders. It should be understood that only the preferred embodiments have been presented and that all changes, modifications, and further application that come within the spirit of the disclosure are desired to be protected.

What is claimed is:

1. A clamp apparatus for connection to a miter saw, the clamp apparatus comprising:
   a shaft configured for connection to the miter saw, said shaft defining a first flat clamp face and an opposite second flat clamp face that is parallel to said first flat clamp face; and
   a carriage assembly slidably coupled to said shaft, said carriage assembly including
      a carriage body including an upper arm spaced apart from a lower arm by a neck portion, said lower arm defining a first bore through which said shaft is configured to extend and a flat clamp surface, a bore axis is defined by said first bore and extends through said upper arm, said first bore is located between said upper arm and said flat clamp surface along said bore axis,
      a first clamp assembly configured for movement relative to said carriage body between a first unclamped position and a first clamped position, said first clamp assembly further configured (i) to enable movement of said carriage body relative to said shaft when said first clamp assembly is in said first unclamped position and (ii) to prevent movement of said carriage body relative to said shaft when said first clamp assembly is in said first clamped position, and said first clamp assembly including an eccentric member rotatably connected to said carriage body, and located directly opposite from said flat clamp surface, such that when said first clamp assembly is in said first clamped position said eccentric member is clamped against said first flat clamp face and said flat clamp surface is clamped against said second flat clamp face to prevent movement of said carriage body relative to said shaft, and
   a second clamp assembly configured for movement relative to said carriage body between a second unclamped position and a second clamped position, said second clamp assembly including a foot member, said second clamp assembly configured to move said foot member away from said carriage body in response to said second clamp assembly moving from said second unclamped position to said second clamped position,
   wherein said shaft is not covered by said carriage body between said first bore and said upper arm.

2. The clamp apparatus of claim 1, wherein:
   said carriage body defines a second bore configured to slidably receive said shaft, and
   said second bore defines an axis that is coaxial with said bore axis.

3. The clamp apparatus of claim 1, wherein:
   the miter saw defines a workpiece support surface, and
   said foot member is moved toward said workpiece support surface when said second clamp assembly is moved from said second unclamped position to said second clamped position.

4. The clamp apparatus of claim 3, wherein:
   when said first clamp assembly is in said first unclamped position said carriage body is slidable relative to said shaft in a sliding direction for a first distance,
   said foot member moves a second distance toward the workpiece support surface in only said sliding direction in response to said second clamp assembly moving from said second unclamped position to said second clamped position, and
   said first distance is substantially greater than said second distance.

5. The clamp apparatus of claim 1, wherein:
   a portion of said eccentric member moves toward said flat clamp surface and said shaft when said first clamp assembly is moved from said first unclamped position to said first clamped position.

6. The clamp apparatus of claim 1, wherein said second clamp assembly includes:
   a first linkage extending from said foot member,
   a second linkage rotatably attached to said first linkage,
   a third linkage rotatably attached to said second linkage and rotatably attached to said carriage body, and
   a handle portion extending from said third linkage.

7. The clamp apparatus of claim 1, wherein:
   said shaft includes a first shoulder,
   said shaft includes a second shoulder, and
   said carriage body is slidable on said shaft between said first shoulder and said second shoulder when said first clamp assembly is in said first unclamped position.

8. A workpiece clamp apparatus for connection to a miter saw, the workpiece clamp apparatus comprising:

a shaft configured for connection to the miter saw, said shaft defining a first flat clamp face and an opposite second flat clamp face that is parallel to said first flat clamp face; and a carriage assembly slidably coupled to said shaft, said carriage assembly including a carriage body slidable on said shaft between an upper carriage position and a lower carriage position in a sliding direction, said carriage body including an upper arm spaced apart from a lower arm by a neck portion, said lower arm defining a first bore through which said shaft is configured to extend and a flat clamp surface, a bore axis is defined by said first bore and extends through said upper arm, and said first bore is located completely between said upper arm and said flat clamp surface along said bore axis, a first clamp assembly including an eccentric member rotatably connected to said carriage body, and located directly opposite from said flat clamp surface, such that when said first clamp assembly is in a clamped position said eccentric member is clamped against said first flat clamp face and said flat clamp surface is clamped against said second flat clamp face to prevent sliding movement of said carriage assembly relative to said shaft, and a second clamp assembly configured for movement relative to said carriage body between an unclamped position and a clamped position, said second clamp assembly including a foot member, said second clamp assembly configured to move said foot member away from said carriage body in only said sliding direction in response to said second clamp assembly moving from said unclamped position to said clamped position, wherein said shaft is not covered by said carriage body between said first bore and said upper arm, such that no portion of said carriage body contacts said shaft between said first bore and said upper arm.

9. The workpiece clamp apparatus of claim 8, wherein:
said first clamp assembly is further configured to enable sliding movement of said carriage body relative to said shaft when said first clamp assembly is in an unclamped position.

10. The workpiece clamp apparatus of claim 9, wherein:
said carriage body defines a second bore configured to slidably receive said shaft, and
said second bore defines an axis that is coaxial with said bore axis.

11. The workpiece clamp apparatus of claim 9, wherein a portion of said eccentric member moves toward said clamp surface and said shaft when said first clamp assembly is moved from said unclamped position to said clamped position.

12. The workpiece clamp apparatus of claim 8, wherein said second clamp assembly includes:
a first linkage extending from said foot member,
a second linkage rotatably attached to said first linkage,
a third linkage rotatably attached to said second linkage and rotatably attached to said carriage body, and
an handle portion extending from said third linkage.

13. A clamp apparatus for connection to a support structure of a power saw, the clamp apparatus comprising:

a first shaft configured for connection to the support structure of the power saw, said shaft defining a first flat clamp face and an opposite second flat clamp face that is parallel to said first flat clamp face;

a carriage body slidably coupled to said first shaft and configured for movement in a sliding direction, said carriage body including an upper arm spaced apart from a lower arm by a neck portion, said lower arm defining a first bore through which said shaft is configured to extend and a flat clamp surface, a bore axis is defined by said first bore and extends through said upper arm, and said first bore is located completely between said upper arm and said flat clamp surface along said bore axis;

a first clamp assembly coupled to said carriage body, said first clamp assembly configured for movement relative to said carriage body between an unclamped position and a clamped position, said first clamp assembly further configured (i) to enable movement of said carriage body relative to said first shaft when said first clamp assembly is in said unclamped position and (ii) to prevent movement of said carriage body relative to said first shaft when said first clamp assembly is in said clamped position, and said first clamp assembly including an eccentric member rotatably connected to said carriage body, and located directly opposite from said flat clamp surface, such that when said first clamp assembly is in said clamped position said eccentric member is clamped against said first flat clamp face and said flat clamp surface is clamped against said second flat clamp face to prevent movement of said carriage body relative to said shaft; and a second clamp assembly coupled to said carriage body, said second clamp assembly including a handle portion configured for movement relative to said carriage body between an unclamped position and a clamped position and a foot member operably connected to said handle portion, said foot member configured to move away from said carriage body in only said sliding direction in response to said handle portion moving from said unclamped position to said clamped position, wherein said shaft is not covered by said carriage body between said first bore and said upper arm, such that no portion of said carriage body contacts said shaft between said first bore and said upper arm.

14. The clamp apparatus of claim 13, wherein:
said carriage body defines a second bore configured to slidably receive said first shaft, and
said second bore defines an axis that is coaxial with said bore axis.

15. The clamp apparatus of claim 14, wherein:
said second clamp assembly includes a second shaft,
said foot member extends from said second shaft, and
said carriage body defines a third bore configured to slidably receive said second shaft.

16. The clamp apparatus of claim 13, wherein:
a portion of said eccentric member moves toward said clamp surface and said first shaft when said first clamp assembly is moved from said unclamped position to said clamped position.

\* \* \* \* \*